(12) United States Patent
Matsuura

(10) Patent No.: US 8,141,939 B2
(45) Date of Patent: Mar. 27, 2012

(54) ALL TERRAIN VEHICLE WITH LOWER PORTION PROTECTOR

(75) Inventor: Tatsuya Matsuura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1096 days.

(21) Appl. No.: 11/965,482

(22) Filed: Dec. 27, 2007

(65) Prior Publication Data

US 2009/0015037 A1 Jan. 15, 2009

Related U.S. Application Data

(60) Provisional application No. 60/949,574, filed on Jul. 13, 2007.

(51) Int. Cl.
*B62D 27/02* (2006.01)

(52) U.S. Cl. .......... 296/204; 296/205; 296/29; 180/69.1

(58) Field of Classification Search ............. 296/187.03; 180/219
See application file for complete search history.

(56) References Cited

U.S. PATENT DOCUMENTS

| | | | | |
|---|---|---|---|---|
| 5,064,016 A | * | 11/1991 | Iwai et al. | 180/215 |
| 5,076,387 A | * | 12/1991 | Oka | 180/215 |
| 5,992,926 A | * | 11/1999 | Christofaro et al. | 296/204 |
| 2002/0166709 A1 | * | 11/2002 | Michisaka et al. | 180/219 |

FOREIGN PATENT DOCUMENTS

JP 2005-001510 A 1/2005

* cited by examiner

*Primary Examiner* — Tony H. Winner
*Assistant Examiner* — Jacob Knutson
(74) *Attorney, Agent, or Firm* — Keating & Bennett, LLP

(57) ABSTRACT

A protector includes: a protector main body covering the lower portion of the vehicle body and a fixing plate for fixing the protector main body to the vehicle body. The protector main body has a surface portion and a recessed portion recessed from the surface portion to the vehicle body. The fixing plate has a plurality of the first insertion holes through which the fastening members for securing the protector main body to the vehicle body are passed. The recessed portion has second insertion holes through which fastening members are passed. The fixing plate is disposed in the recessed portion. The plurality of the first insertion holes are formed apart from one another.

20 Claims, 10 Drawing Sheets

ALL TERRAIN VEHICLE WITH LOWER PORTION PROTECTOR

This application claims priority from and incorporates by reference U.S. Provisional Patent Application Ser. No. 60/949,574 filed Jul. 13, 2007, entitled "All Terrain Vehicle With Lower Portion Protector."

BACKGROUND OF THE INVENTION

1. Field of the Invention

The present invention relates to an all terrain vehicle with a lower portion protector.

2. Description of the Related Art

Hitherto, so-called all terrain vehicles (ATVs) have been provided which can travel on any terrain such as bog, sandy beaches, snowy roads, paved roads, and mountain paths. For such all terrain vehicles, a structure in which a protector is disposed at the lower rear end of the rear arm is widely used for protecting the lower portion of the vehicle body, specifically, a drive chain for driving the rear axle and the periphery of the drive chain (for example, JP-A-2005-1510, p. 6, FIG. 4).

However, such related-art protectors have the following problem: if the protector disposed at the lower rear end of the rear arm comes into collision with the road surface while an all terrain vehicle is traveling on terrain, the protector can be wrested off.

SUMMARY OF THE INVENTION

The invention is made in view of such circumstances. Accordingly, it is an object of the invention to provide an all terrain vehicle equipped with a protector for covering the lower portion of the vehicle body in which the protector is prevented from coming off by collision with the road surface, and to provide such a protector assembly.

The invention has the following characteristics to solve the above problem. According to a first aspect of the invention, there is provided an all terrain vehicle (all terrain vehicle 10) including a vehicle body (vehicle body 10a) and a protector for protecting the lower portion of the vehicle body. The protector includes: a protector main body (protector main body 110) covering the lower portion (rear arm 50) of the vehicle body and a fixing plate (fixing plate 200) used to fix the protector main body to the vehicle body, the protector main body has a surface portion (surface portion 111) and a recessed portion (recessed portion 120) recessed from the surface portion to the vehicle body, the fixing plate has a plurality of the first insertion holes (insertion hole 231) through which fastening members (bolt 251) for securing the protector main body to the vehicle body are passed, the recessed portion has second insertion holes (insertion holes 161L, 161R, insertion holes 162L, 162R) through which the fastening members are passed, the fixing plate is disposed in the recessed portion, the plurality of the first insertion holes being apart from one another.

The second aspect of the invention is the all terrain vehicle according to the first aspect of the invention, wherein the plurality of the first insertion holes are apart from one another in the width direction (D1 direction) of the all terrain vehicle.

The third aspect of the invention is the all terrain vehicle according to the first aspect of the invention, wherein the recessed portion includes a mounting wall (mounting wall 121) for placement adjacent to the vehicle body side and a side wall (side wall 122) extending from the mounting wall in the direction apart from the vehicle body; and the fixing plate is mounted to the mounting wall.

The fourth aspect of the invention is the all terrain vehicle according to the third aspect of the invention, wherein the periphery of the mounting wall is surrounded by the side wall.

The fifth aspect of the invention is the all terrain vehicle according to the fourth aspect of the invention, wherein the height of the side wall (height H2) is higher than the height (height H1) that is at least the sum of the thickness of the fixing plate and the thickness of the head (head 251a) of each fastening member.

The sixth aspect of the invention is the all terrain vehicle according to the first aspect of the invention, wherein the protector main body is made of predetermined synthetic resin (for example, polypropylene). The protector main body may be made of such predetermined synthetic resin formed into a unitary molded structure.

The seventh aspect of the invention is the all terrain vehicle according to the first aspect of the invention, wherein the fixing plate is made of predetermined metal (for example, aluminum alloy).

The eighth aspect of the invention is the all terrain vehicle according to the first aspect of the invention, wherein the all terrain vehicle further includes: rear wheels (rear wheels 90L and 90R); and a rear arm (rear arm 50) for supporting the rear wheels substantially vertically movably, wherein the protector is mounted to the lower portion of the rear arm (mounting portion 55L and 55R).

The ninth aspect of the invention is the all terrain vehicle according to the sixth aspect of the invention, wherein the protector is mounted to the rear ends of the rear arm (rear end 50a).

The tenth aspect of the invention is the all terrain vehicle according to the third aspect of the invention, wherein the fixing plate includes: a first platy portion (first platy portion 210) extending along the width of the all terrain vehicle; and a pair of second platy portions (second platy portion 220) connecting to the end of the first platy portion in the vehicle width direction and extending to the rear of the all terrain vehicle; and the plurality of the first insertion holes is formed in the first platy portion and the second platy portions.

The eleventh aspect of the invention is the all terrain vehicle according to the third aspect of the invention, wherein the side wall includes a rear wall portion (rear wall portion 122a) located behind the fixing plate, the rear wall portion being inclined to the rear of the all terrain vehicle as the distance from the mounting wall increases.

DESCRIPTION OF THE PREFERRED EMBODIMENT

Figure 1:
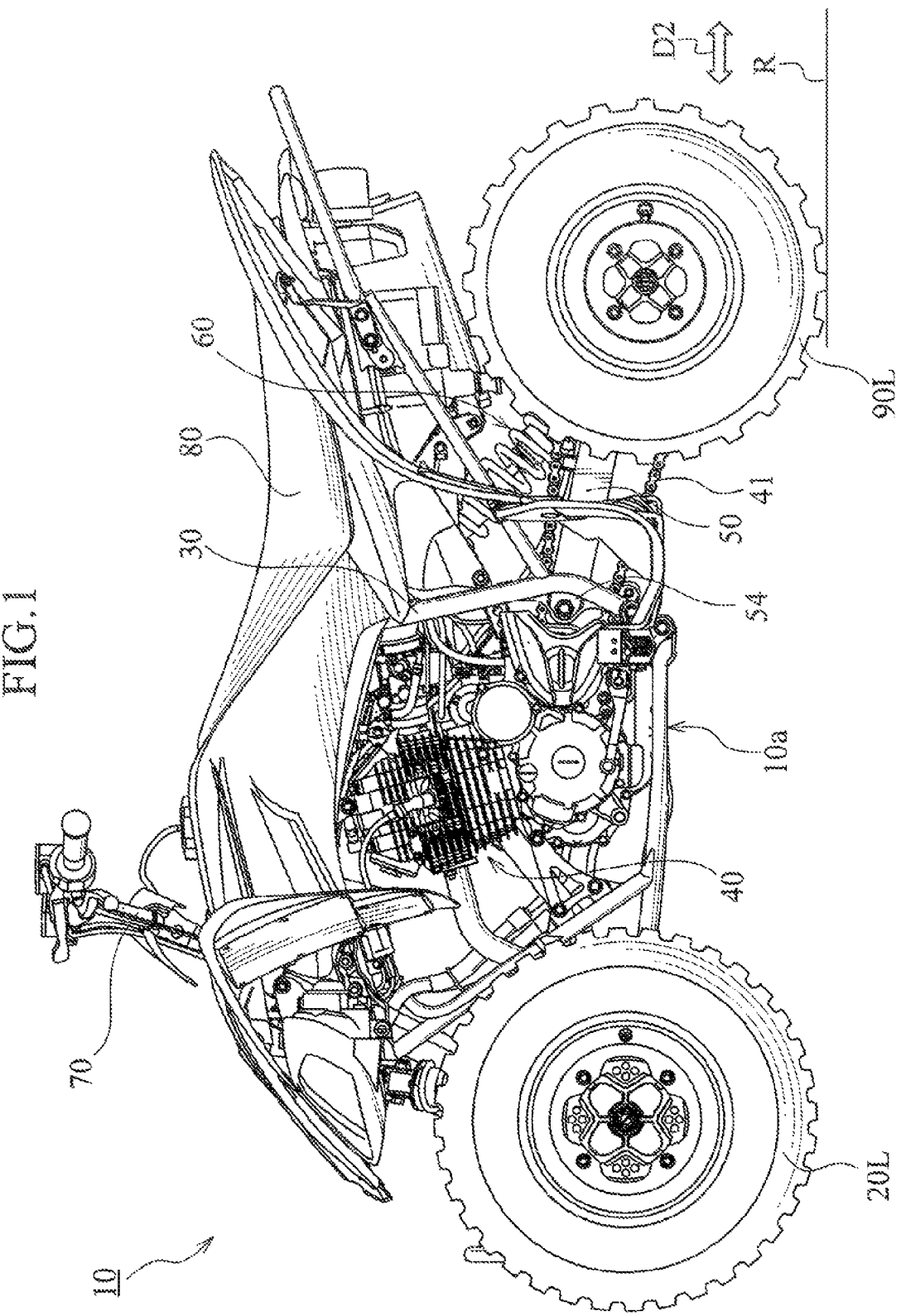
FIG. 1 is a left side view of an all terrain vehicle 10 according to an embodiment of the invention.

An embodiment of the invention will be described. Specifically, (1) Schematic overall structure of all terrain vehicle, (2) Mounting state of protector, (3) Shape of protector, (4) Shape of rear arm, (5) Operation and advantages, and (6) Other embodiments will be described.

In the drawings, the same or similar parts in each of the drawings are identified by the same or similar reference numerals. It should be noted that the drawings are schematic, so that the proportions of the sizes are different from actual ones.

Thus, specific sizes should be determined in consideration of the following description. It should also be noted that the relationship and the proportions among the sizes in the drawing may also be different.

1. Schematic Overall Structure of All Terrain Vehicle

Figure 2:
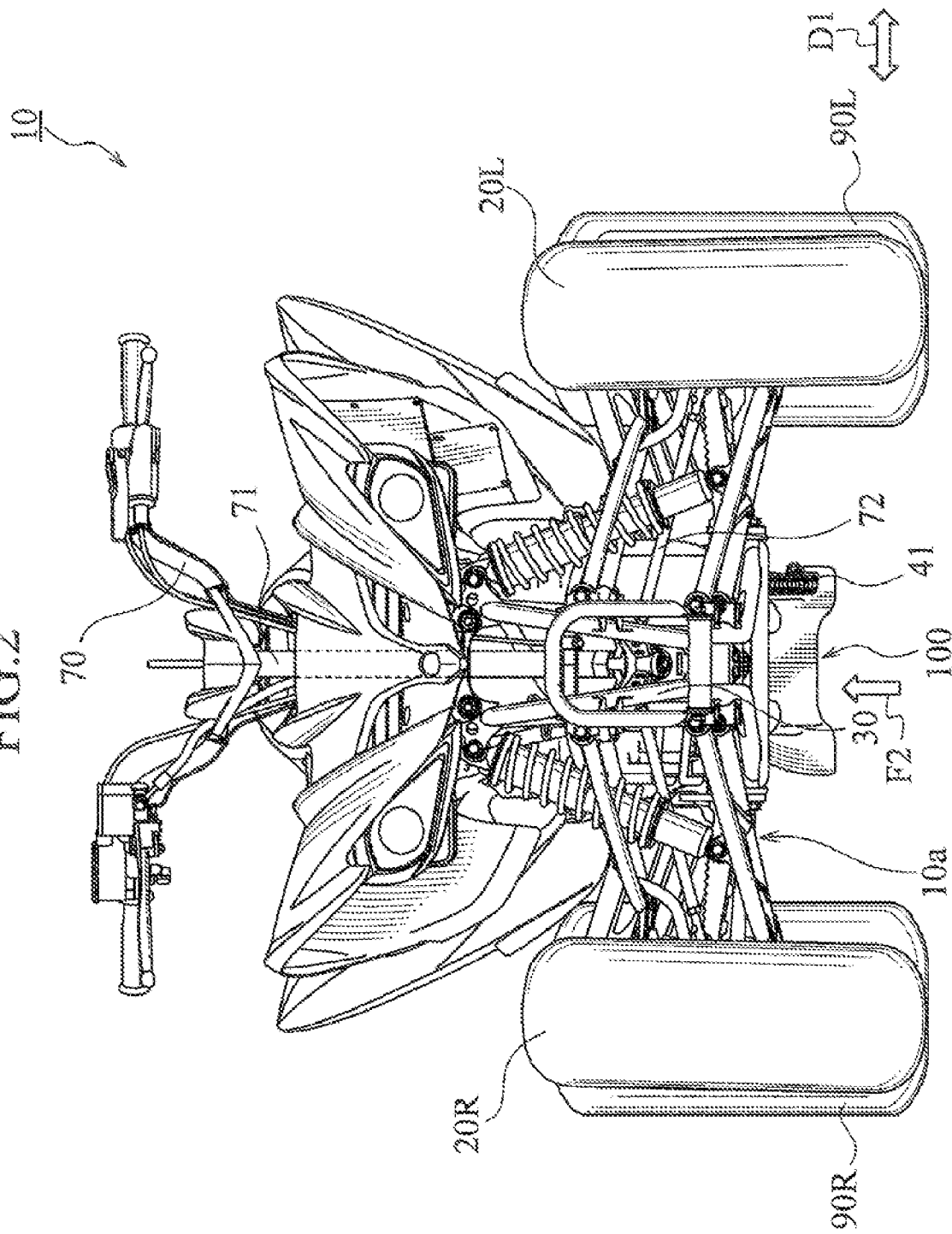
FIG. 2 is a front view of the all terrain vehicle 10 according to the embodiment of the invention.

FIG. 1 is a left side view of an all terrain vehicle 10 according to an embodiment of the invention. FIG. 2 is a front view of the all terrain vehicle 10.

As shown in FIGS. 1 and 2, the all terrain vehicle 10 includes four wheels, specifically, front wheels 20L and 20R and rear wheels 90L and 90R.

A body frame 30 constitutes the frame of a vehicle body 10a. Mounted on the body frame 30 are an engine 40, a rear arm 50, a cushion unit 60, a handle 70, a seat 80 and so on. In other words, the vehicle body 10a includes the body frame 30, the engine 40, the rear arm 50, the cushion unit 60, the handle 70, and the seat 80. The vehicle body 10a does not include the front wheels 20L and 20R and the rear wheels 90L and 90R.

The engine 40 generates power and transmits the generated power to the rear wheels 90L and 90R via a drive chain 41.

The rear arm 50 supports the rear wheels 90L and 90R so as to pivot substantially vertically. Specifically, the rear arm 50 has a pivot 54 which is pivotally supported by the body frame 30.

The cushion unit 60 is connected to the body frame 30 and the rear arm 50. The cushion unit 60 absorbs the impact on the rear wheels 90L and 90R.

The handle 70 is connected to the front wheels 20L and 20R via a steering shaft 71 and a tie rod 72.

The seat 80 is disposed between the front wheels 20L and 20R and the rear wheels 90L and 90R. The rider sits in the seat 80 in such a manner as to straddle the all terrain vehicle 10.

As shown in FIG. 2, a protector 100 is disposed at the lower portion of the vehicle body 10a. Specifically, the protector 100 is mounted to the rear arm 50. That is, the protector 100 protects the lower portion of the vehicle body 10a.

2. Mounting State of Protector

Figure 3:
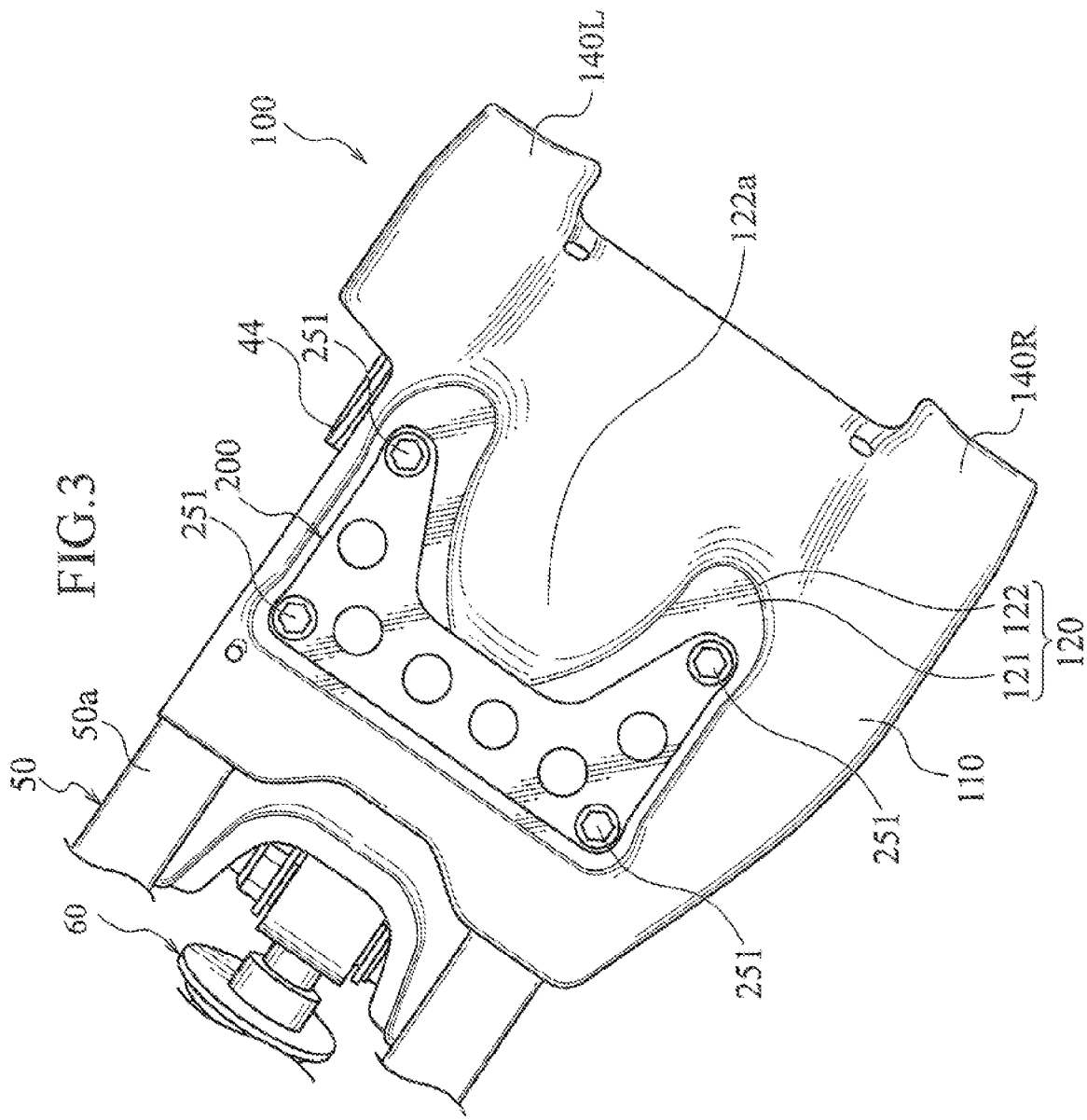
FIG. 3 is a fragmentary enlarged plan view of a protector 100 and the periphery thereof according to the embodiment of the invention.
Figure 4:
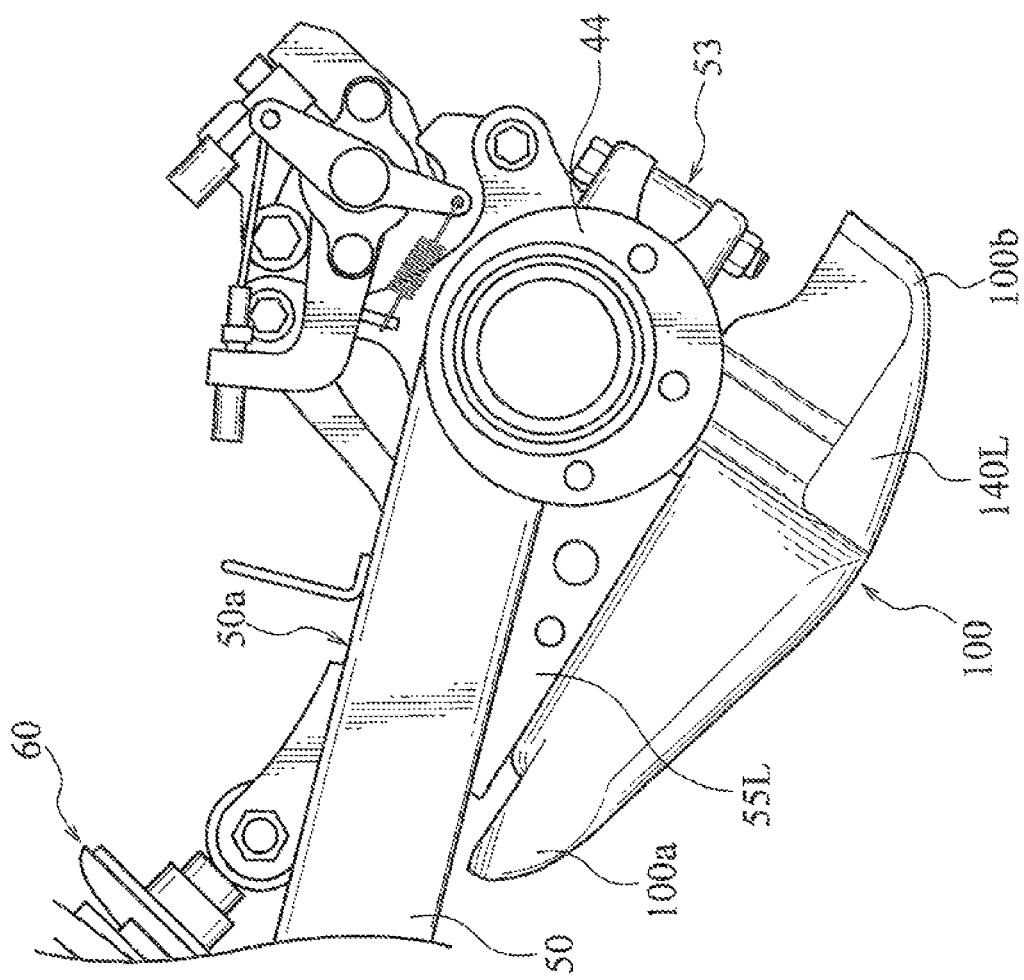
FIG. 4 is a fragmentary enlarged left side view of the protector 100 and the periphery thereof according to the embodiment of the invention.
Figure 5:
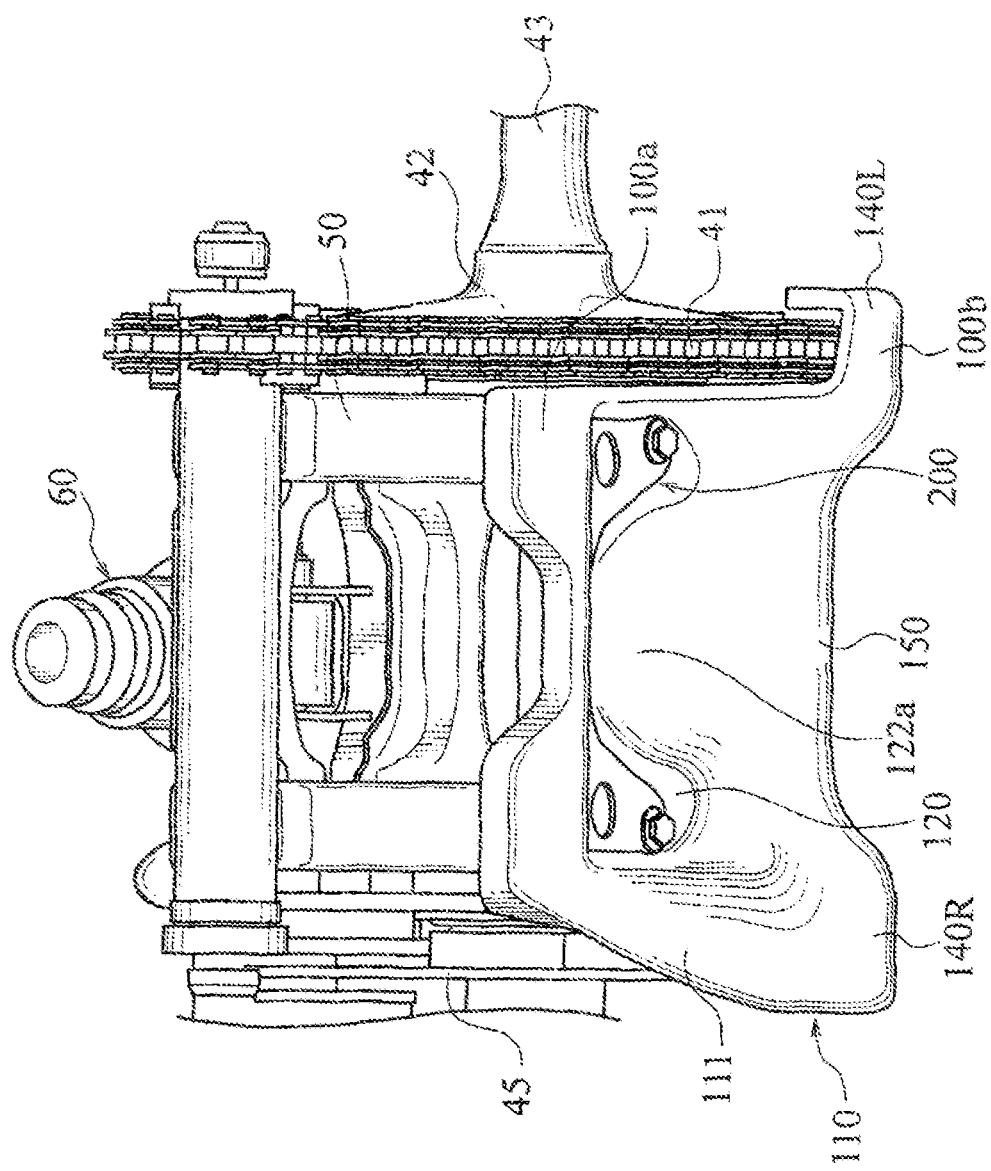
FIG. 5 is a fragmentary enlarged front view of the protector 100 and the periphery thereof according to the embodiment of the invention.

FIG. 3 is a fragmentary enlarged plan view of the protector 100 and the periphery thereof. Specifically, FIG. 3 is a diagram as viewed along an arrow F2 of FIG. 2. FIG. 4 is a fragmentary enlarged left side view of the protector 100 and the periphery thereof. FIG. 5 is an enlarged front view of the protector 100 and the periphery thereof. FIGS. 3 and 4 omit the indication of the drive chain 41 and so on.

The protector 100 is mounted to the rear ends 50a of the rear arm 50. The protector 100 prevents the lower portion of the rear arm 50 from coming into contact with the road surface into damage. The protector 100 is mounted to mounting portions 55L and 55R (not shown in FIG. 4, see FIG. 9) of the rear arm 50.

The protector 100 includes a protector main body 110 and a fixing plate 200. In this embodiment, the protector main body 110 is made of polypropylene (a predetermined synthetic resin). In this embodiment, the fixing plate 200 is made of an aluminum alloy (a predetermined metal). The fixing plate 200 is used to fix the protector main body 110 to the vehicle body 10a.

The protector main body 110 has a surface portion 111 and a recessed portion 120. The recessed portion 120 is recessed from the surface portion 111 to the vehicle body 10a.

The recessed portion 120 has a mounting wall 121 and a side wall 122. The mounting wall 121 is located adjacent to the vehicle body 10a. The side wall 122 extends from the mounting wall 121 in the direction apart from the vehicle body 10a. The periphery of the mounting wall 121 is surrounded by the side wall 122. The side wall 122 includes a rear wall portion 122a located behind the fixing plate 200.

The fixing plate 200 is disposed in the recessed portion 120. Specifically, the fixing plate 200 is mounted to the flat mounting wall 121. The fixing plate 200 is fixed to the mounting portions 55L and 55R of the rear arm 50, together with the protector main body 110 with the bolts 251 (fastening member).

The mounting portions 55L and 55R are triangular in side view. Therefore, the protector 100 is mounted such that it comes closer to the road surface R (see FIG. 1) as it comes close to the rear of the all terrain vehicle 10. Specifically, the rear end 100b of the protector 100 is located lower than the front end 100a.

A hub 44 that rotatably supports a rear axle 43 is disposed on the protector 100. The rear axle 43 is joined with a driven sprocket 42. The drive chain 41 is wound around the driven sprocket 42.

The hub 44 is tightened by fastening portions 53. The hub 44 supports the rear axle 43 such that it is eccentric from the center of the hub 44. Thus, the tension of the drive chain 41 can be adjusted by rotating the hub 44, with bolts (not shown) in the fastening portions 53 loosened.

Side end portions 140L and 140R are provided at the rear of the protector main body 110. The side end portion 140L covers the lower end of the drive chain 41 to protect it. The side end portion 140R covers the lower end of a brake disc 45 to protect it.

Between the side end portions 140L and 140R is formed a recessed portion 150. The recessed portion 150 is recessed from the side end portions 140L and 140R to the vehicle body 10a.

3. Shape of Protector

The shape of the protector 100 will next be described. Specifically, the shapes of the protector main body 110 and the fixing plate 200 will be described.

3.1 Protector Main Body 110

Figure 6:
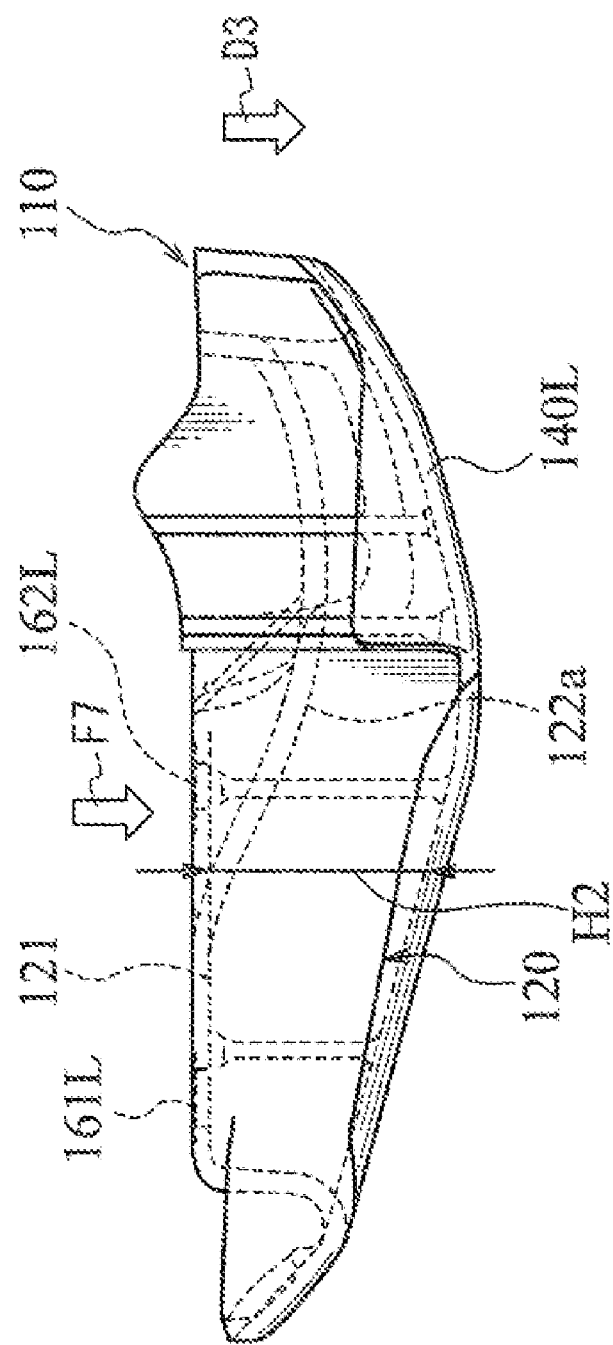
FIG. 6 is a left side view of the protector main body 110 according to the embodiment of the invention.
Figure 7:
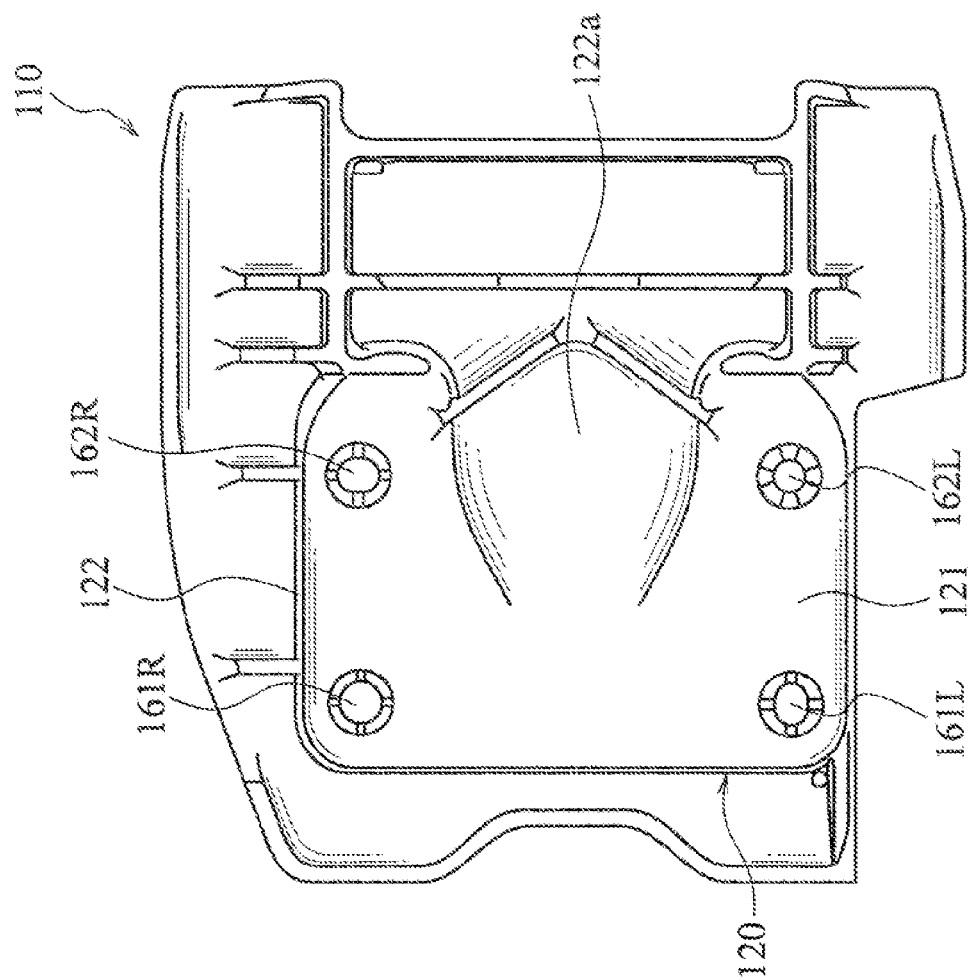
FIG. 7 is a diagram of the protector main body as viewed in the direction of an arrow F7 of FIG. 6.

FIG. 6 is a left side view of the protector main body 110. FIG. 7 is a diagram as viewed along an arrow F7 of FIG. 6.

As shown in FIGS. 6 and 7, the mounting wall 121 of the recessed portion 120 has insertion holes 161L and 161R and insertion holes 162L and 162R through which bolts 252 (see FIG. 3) are passed. In this embodiment, the insertion holes 161L and 161R and the insertion holes 162L and 162R are first insertion holes.

The outer edge of the mounting wall 121 has the side wall 122 in the direction apart from the vehicle body 10a, that is, downward. As shown in FIG. 6, a rear wall portion 122a that constitutes the side wall 122 is inclined to the rear of the all terrain vehicle 10 as the distance (direction of D3 in FIG. 6) from the mounting wall 121 increases.

3.2 Fixing Plate 200

Figure 8:
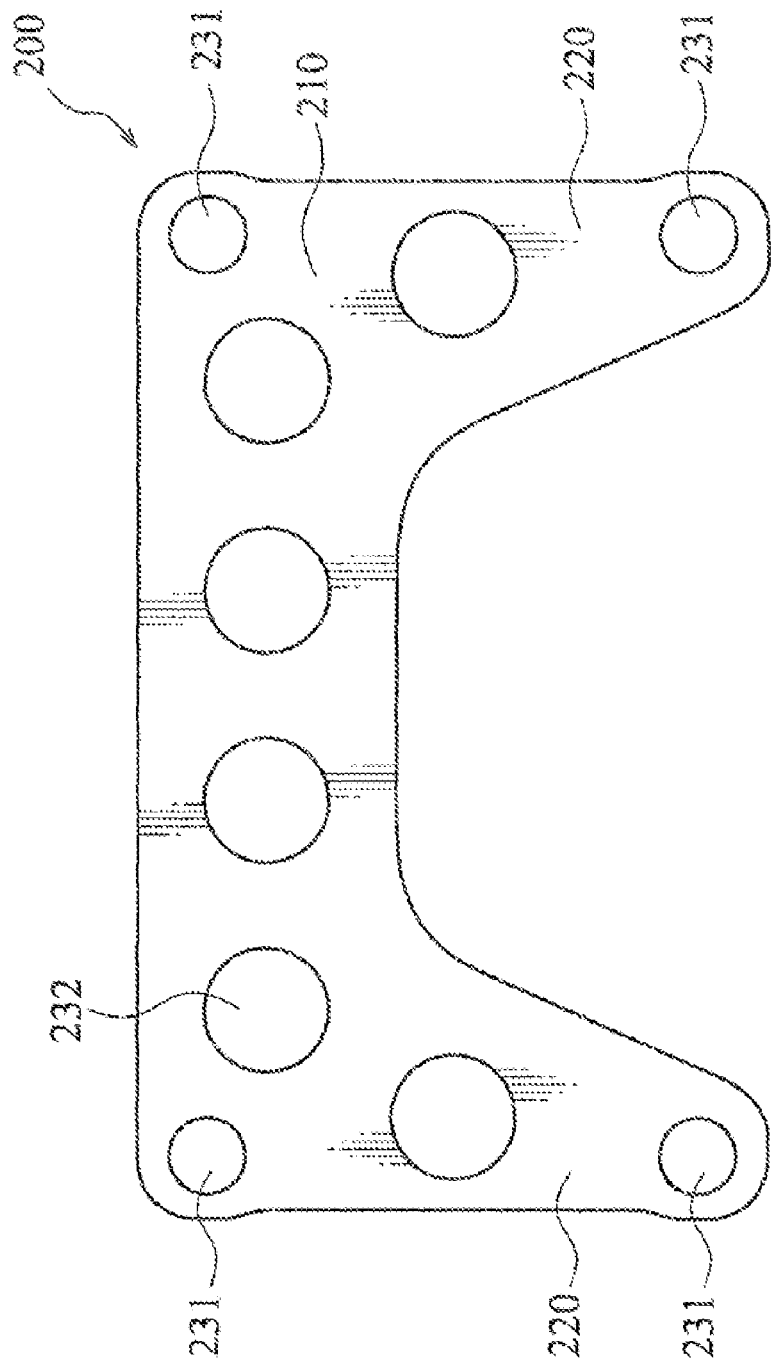
FIG. 8 is a plan view of a fixing plate 200 according to the embodiment of the invention.

FIG. 8 is a plan view of the fixing plate 200. As shown in FIG. 8, the fixing plate 200 is shaped like a plate. The fixing plate 200 includes a first platy portion 210 extending along the width of the all terrain vehicle 10 (in the direction of D1 shown in FIG. 2) and a pair of second platy portions 220 connecting to the ends of the first platy portion 210 in the width direction and extending to the rear of the all terrain vehicle 10.

The fixing plate 200 has a plurality of insertion holes 231 through which bolts 251 for fixing the protector main body 110 to the vehicle body 10a, specifically, to the rear arm 50 are passed. In this embodiment, the insertion holes 231 are first insertion holes.

The insertion holes 231 are formed in the first platy portion 210 and the second platy portions 220. That is, the insertion holes 231 are formed apart from one another in the front-back direction of the all terrain vehicle 10 (in the direction of D2 shown in FIG. 1). The insertion holes 231 are also formed apart from one another in the width direction of the all terrain vehicle 10 (in the direction of D1 shown in FIG. 2).

The fixing plate 200 also has a plurality of circular holes 232. The circular holes 232 are provided to reduce the weight of the fixing plate 200 while ensuring rigidity necessary for the fixing plate 200.

4. Shape of Rear Arm

Figure 9:
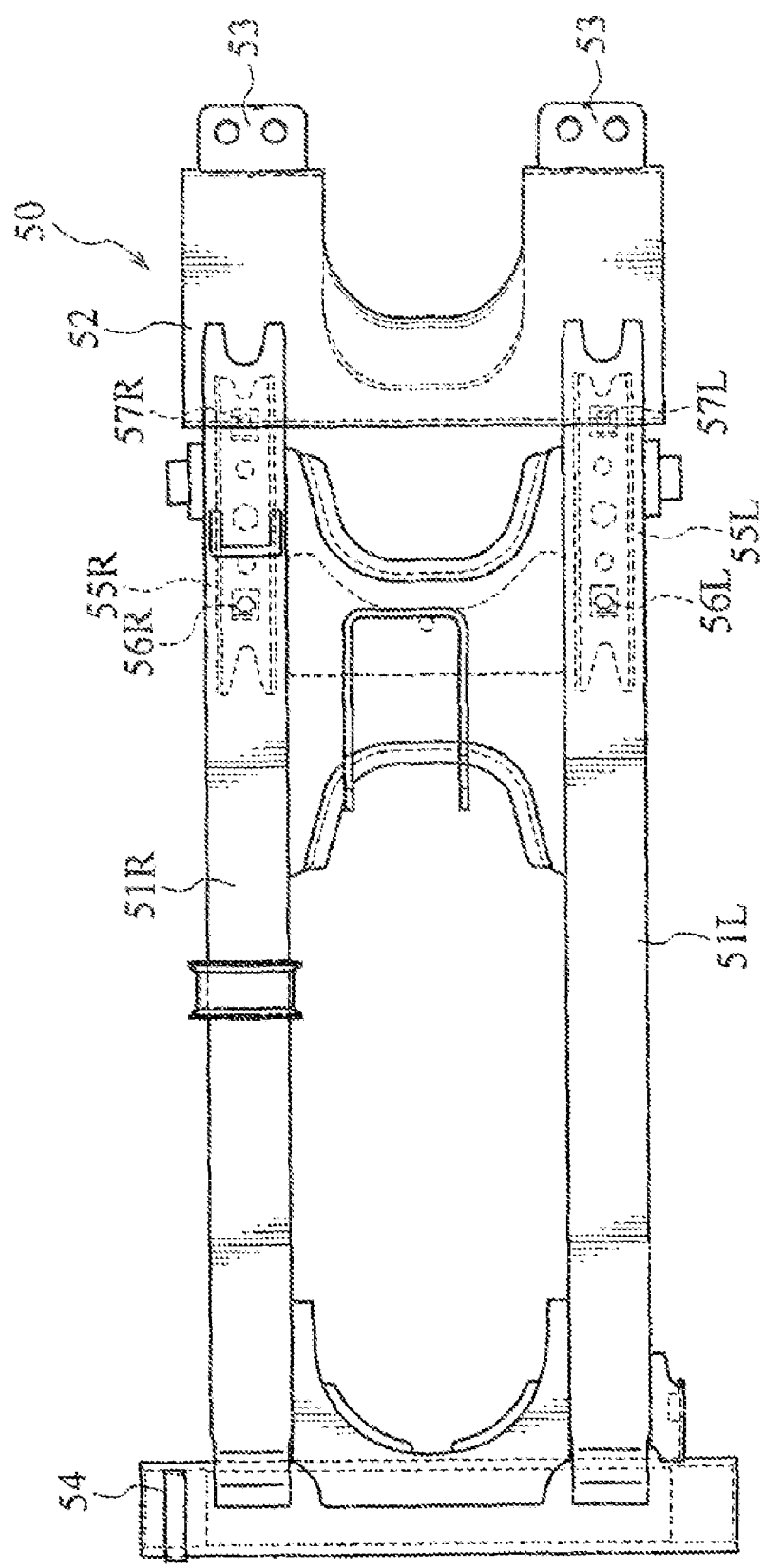
FIG. 9 is a plan view of a rear arm 50 according to the embodiment of the invention.
Figure 10:
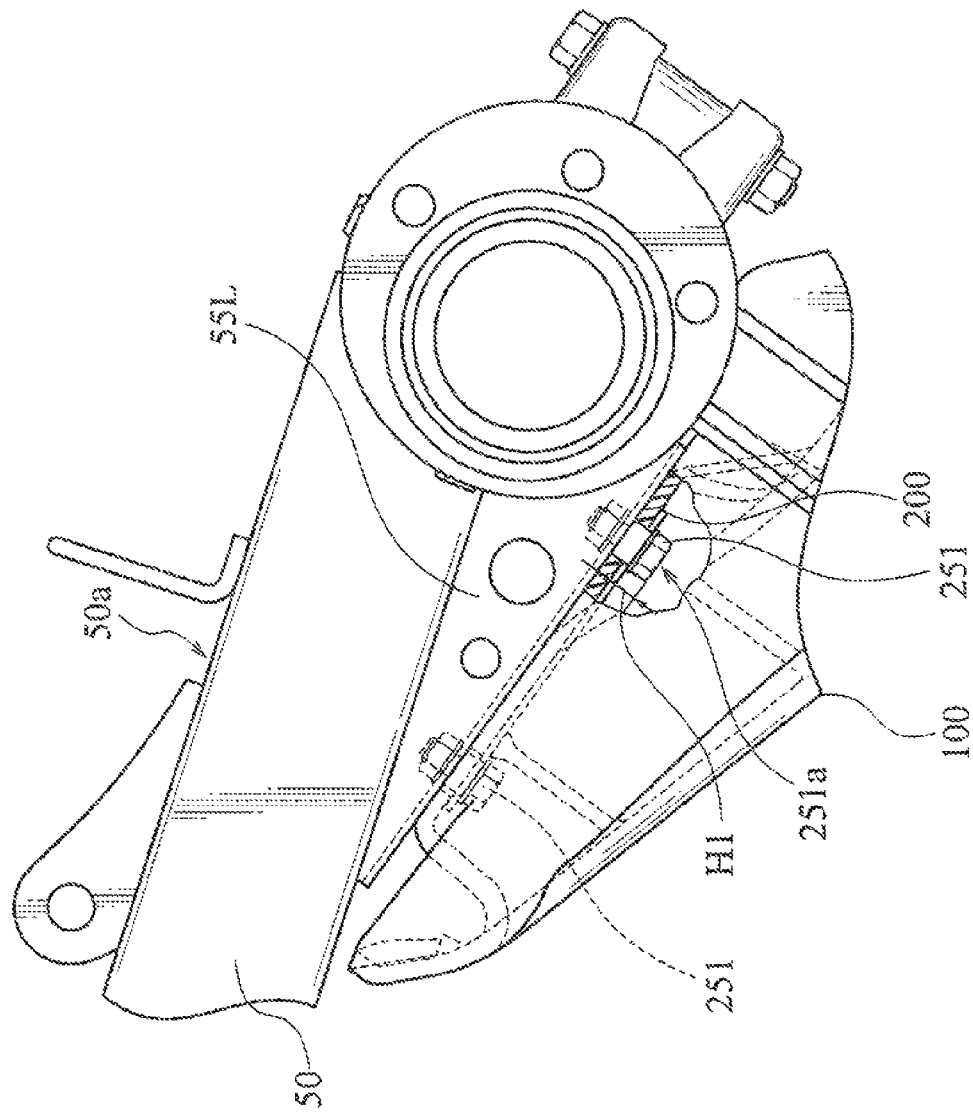
FIG. 10 is an enlarged side view of the rear end 50a of the rear arm 50 according to the embodiment of the invention.

The shape of the rear arm 50 will now be described. FIG. 9 is a plan view of the rear arm 50. As shown in FIG. 9, the rear arm 50 has a pair of right and left arms 51R and 51L, a hub supporting portion 52, fastening portions 53, and a pivot portion 54. FIG. 10 is an enlarged side view of the rear end 50a of the rear arm 50.

The arm 51L has a mounting portion 55L. Likewise, the arm 51R has a mounting portion 55R. As shown in FIG. 10, the protector 100 is mounted to the mounting portion 55L (55R).

The mounting portion 55L has bolt holes 56L and 57L into which the bolts 251 are screwed. Likewise, the mounting portion 55R has bolt holes 56R and 57R.

The height H2 of the side wall 122 (see FIG. 6) is higher than the height H1 that is the sum of the thickness of the fixing plate 200 and the thickness of the head 251a of each bolt 251.

5. Operation and Advantages

In the all terrain vehicle 10, the fixing plate 200 for fixing the protector main body 110 to the rear arm 50 is disposed in the recessed portion 120 of the protector main body 110 which is recessed from the surface portion 111 to the vehicle body 10a. The protector main body 110 and the fixing plate 200 are fixed to the rear arm 50 with the bolts 251 passed through the insertion holes 231 formed in separate positions.

That is, in the all terrain vehicle 10, the protector main body 110 can be fixed tightly with the bolts 251 passed through the separate insertion holes 231. Moreover, the possibility of damages to the fixing plate 200 disposed in the recessed portion 120 can be decreased even if the protector main body 110 comes into collision with the road surface R. This prevents the protector 100 from being wrenched off even if it comes into collision with the road surface R.

In the embodiment, the fixing plate 200 is mounted to the mounting wall 121 of the protector main body 110. The periphery of the mounting wall 121 is surrounded by the side wall 122. Moreover, the height H2 of the side wall 122 is higher than the height H1 that is the sum of the thickness of the fixing plate 200 and the thickness of the head 251a of each bolt 251.

This surely prevents the periphery of the bolts 251 that fix the protector main body 110 to the rear arm 50 from coming into contact with the road surface R.

In this embodiment, the protector main body 110 is formed of synthetic resin (polypropylene). The fixing plate 200 is formed of metal (an aluminum alloy).

This structure more reliably prevents the protector 100 from being wrenched off by contact with the road surface R in case the protector main body 110 made of synthetic resin, particularly, the periphery of the insertion holes 161L and 161R and the insertion holes 162L and 162R of the protector main body 110 is deformed by contact with the road surface R.

Specifically, if the protector main body 110 is fixed to the rear arm 50 only with the bolts 251, the protector main body 110 cannot be retained only with the heads 251a of the bolts 251 when the periphery of the insertion holes 161L and 161R and the insertion holes 162L and 162R is deformed. That is, the heads 251a can pass through the insertion holes 161L and 161R and the insertion holes 162L and 162R, so that the protector main body 110 is wrenched off.

In this embodiment, the insertion holes 231 are formed in the first platy portion 210 of the fixing plate 200 and the pair of second platy portions 220 extending rearward from the first platy portion 210. Thus, the protector main body 110 can be fixed to the rear arm 50 more securely.

In this embodiment, the rear wall portion 122a of the protector main body 110 is inclined to the rear of the all terrain vehicle 10 as the distance from the mounting wall 121 increases. This structure reduces the possibility that the recessed portion 120 is caught by a protrusion (rock) on the road surface R to damage the protector main body 110 even if the protector main body 110 comes into contact with the road surface R.

6. Other Embodiments

While the invention has been described with reference to a preferred embodiment of the invention, it should not be understood that the description and drawings that constitute a part of the invention limit the invention. It will be obvious to those skilled in the art that various modifications can be made.

For example, the shapes of the protector main body 110 and the fixing plate 200 are merely examples, and are not limited to the foregoing embodiment. For example, the rear wall portion 122a of the protector main body 110 may not necessarily be provided.

In the above embodiment, the protector 100 is mounted to the rear ends 50a of the rear arm 50. As an alternative, the protector 100 may be mounted to the center of the rear arm 50 in the front-back direction. As an alternative, the protector 100 may be mounted to the lower portion of the body frame 30.

In the above embodiment, the protector 100 is fixed to the rear arm 50 with the bolts 251. As an alternative, the protector 100 may be fixed to the rear arm 50 with another fastening member, such as a rivet.

The invention may of course include various embodiments not described here. The technical scope of the invention is therefore to be determined solely by the specifications according to the claims.

What is claimed is:

1. A protective assembly arranged to protect a lower portion of a vehicle body, the protective assembly comprising:
a protector including a main body arranged to cover the lower portion of the vehicle body, the main body including a lower surface, side walls extending upwardly from the lower surface, and an upper surface connecting the side walls; and
a fixing plate arranged to attach the protector to the vehicle body; wherein
the side walls extending upwardly from the lower surface define a downwardly open recess in the main body;
the downwardly open recess has a shape complementary to a shape of the fixing plate, and the fixing plate is located within the downwardly open recess;
the fixing plate includes a plurality of first insertion holes arranged to receive a plurality of fastening members, and the downwardly open recess includes a plurality of second insertion holes arranged to receive the plurality of fastening members; and
a depth of the side walls is larger than a depth of a sum of a thickness of the fixing plate and a height of any portion of the plurality of fastening members that extends beyond the fixing plate in a downward direction.

2. The protective assembly of claim 1, wherein the protector includes a bottom member traversing a width of the protector and intersecting with the side walls.

3. The protective assembly of claim 2, wherein the main body is a unitary molded structure.

4. The protective assembly of claim 3, wherein the main body is comprised of a molded resin.

5. The protective assembly of claim 2, wherein the main body includes a chain guard member.

6. The protective assembly of claim 5, wherein the main body includes a chain guard wall extending downwardly to beyond a chain when the protective assembly is attached to the vehicle body, the chain guard member including a first wall extending outwardly from the chain guard wall to cover the chain from below, and a second wall extending upwardly from the first wall to extend beyond at least a portion of the chain.

7. The protective assembly of claim 2, wherein the protector further includes a brake disc guard member.

8. The protective assembly of claim 7, wherein the protector main body includes a brake disc wall extending downwardly to beyond a brake disc when the protective assembly is attached to the vehicle body, the brake disc guard member including a first wall extending outwardly from the brake disc wall to cover the brake disc from below, and a second wall extending upwardly from the second wall to extend beyond at least a portion of the brake disc.

9. The protective assembly of claim 1, wherein
the fixing plate includes a first planar portion extending along a direction substantially perpendicular to an upwardly extending direction of the plurality of side walls;
the fixing plate includes a pair of second planar portions connected to the first planar portion; and
the plurality of first insertion holes are provided in the first planar portion and the second planar portions.

10. An all terrain vehicle comprising:
a vehicle body;
a protector including a main body arranged to cover a lower portion of the vehicle body, the main body including a lower surface, side walls extending upwardly from the lower surface, and a mounting wall connecting the side walls; and
a fixing plate arranged to attach the main body to the vehicle body, the fixing plate including a plurality of first insertion holes arranged to receive a plurality of fastening members to attach the main body to the lower portion of the vehicle body; wherein
the side walls extending upwardly from the lower surface define a downwardly open recess in the main body;
the downwardly open recess includes a plurality of second insertion holes into which the plurality of fastening members are inserted; and
the fixing plate is disposed within the downwardly open recess from a direction below the vehicle body.

11. The all terrain vehicle according to claim 10, wherein the plurality of the first insertion holes are spaced apart from one another in a width direction of the all terrain vehicle.

12. The all terrain vehicle according to claim 10, wherein the fixing plate is mounted to the mounting wall.

13. The all terrain vehicle according to claim 12, wherein a periphery of the mounting wall is surrounded by the side walls.

14. The all terrain vehicle according to claim 13, wherein a height of the side walls is higher than a sum of a height of a thickness of the fixing plate and a thickness of a head portion of the plurality of fastening members.

15. The all terrain vehicle according to claim 12, wherein
the fixing plate includes a first planar portion extending along a width direction of the all terrain vehicle, the first planar portion including first and second ends spaced apart in the width direction of the all terrain vehicle;
the fixing plate includes second planar portions connected to each of the first and second ends of the first planar portion, the second planar portions extending from the first planar portion towards a rear of the all terrain vehicle; and
the plurality of first insertion holes are provided in the first planar portion and the second planar portions.

16. The all terrain vehicle according to claim 12, wherein the side walls include a rear wall located behind the fixing plate in a longitudinal direction of the all terrain vehicle, and the rear wall is inclined toward a rear of the all terrain vehicle.

17. The all terrain vehicle according to claim 10, wherein the main body is made of synthetic resin.

18. The all terrain vehicle according to claim 10, wherein the fixing plate is made of metal.

19. The all terrain vehicle according to claim 10, further comprising:
a pair of rear wheels; and
a rear arm arranged to support the pair of rear wheels such that the rear wheels are vertically moveable; wherein
the protector is mounted to a lower portion of the rear arm.

20. The all terrain vehicle according to claim 19, wherein the protector is mounted to rear ends of the rear arm.

* * * * *